Oct. 8, 1940.     L. J. WHITE     2,217,583
LIQUEFIED GAS DISPENSING SYSTEM
Filed March 22, 1940
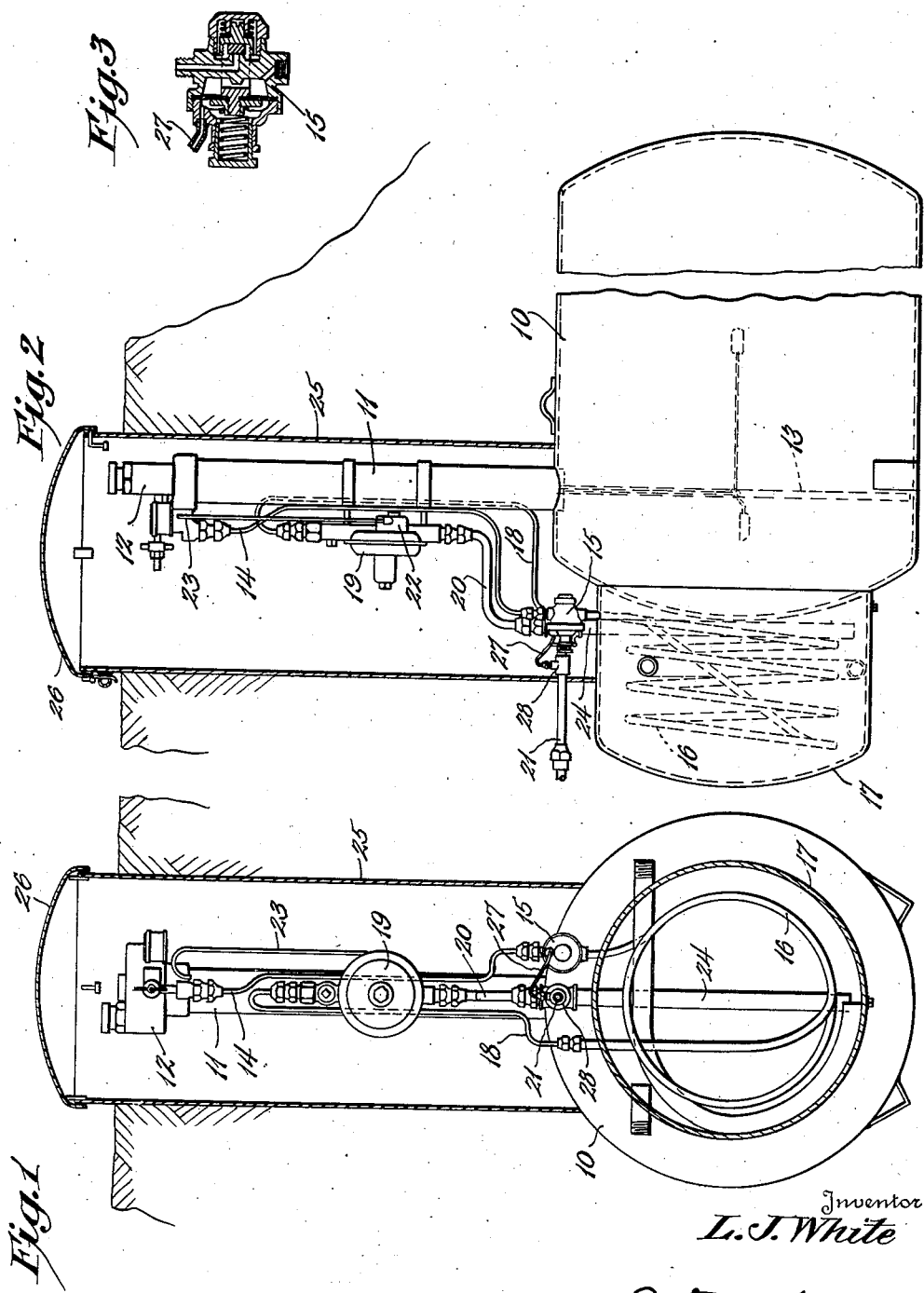

Patented Oct. 8, 1940

2,217,583

UNITED STATES PATENT OFFICE 2,217,583

LIQUEFIED GAS DISPENSING SYSTEM

Loyd J. White, San Antonio, Tex., assignor to Southern Steel Company, a corporation of Texas Application March 22, 1940, Serial No. 325,419

5 Claims. (Cl. 62—1)

This invention relates to liquefied gas dispensing systems of the type employing an underground pressure storage tank charged with liquefied petroleum gas from which the gas is dispensed in the liquid phase through a first stage pressure reducing regulator to a vaporizer, thence through a second stage regulator to the gas service pipe. The main idea is to provide a novel vent for the first stage pressure regulator using the low pressure gas instead of air and thereby eliminating the danger of freezing moisture or water of condensation in an air vent or in the low pressure side of the diaphragm casing which will prevent the regulator from functioning properly. More specifically, the invention provides an ordinary diaphragm regulator for the first stage pressure reduction with the low pressure side of the diaphragm casing vented through a small tube connected to the gas service pipe in which the pressure is only a few ounces.

Other aims and advantages of the invention will appear in the specification, when considered in connection with the accompanying drawing, wherein:

Fig. 1 is an end elevation, partly in section, of a system embodying the invention;

Fig. 2 is a side elevation, partly in section; and

Fig. 3 is a sectional view of the first stage regulator shown in Figs. 1 and 2.

Referring particularly to the drawing, the system there shown for illustrative purposes is generally like that disclosed in a copending application, Ser. No. 314,112, filed January 17, 1940, wherein the liquefied gas is stored in an underground tank 10 having a standpipe 11 to which is connected a unitary valved fitting 12 of the type shown in Patent 2,176,829. The gas is delivered from the tank in the liquid phase through an eduction pipe 13 connected at its upper end to the fiting, thence, through a downwardly extending pipe 14, an ordinary first stage pressure reducing regulator 15 into a vaporizing coil 16 in a cup-shaped water heat exchanging chamber 17 on one end of the tank. This regulator reduces the pressure to about 5 pounds. The pressure in the tank ordinarily ranges between 30 and 60 pounds, depending upon the relative quantities of butane and propane in the fuel mixture and the temperature underground. A part of the liquid vaporizes as it passes through the regulator valve, due to the reduction in pressure and the consequent decrease in the boiling point. The remainder of the liquid passes through the heat exchanging coil 16 and is completely vaporized, whence, it passes through a conduit 18 and a second stage regulator 19 supported on the standpipe 11 to a service pipe 20 having a section 21 adjacent to the first stage regulator. This second stage regulator is preferably of the usual diaphragm type, having a pressure relief valve at 22 on the low pressure side vented to atmosphere through an upstanding breathing tube 23 and it is ordinarily adjustable to maintain a pressure in the service pipe at approximately 6 ounces. A condensate trap or spur tube 24 having a closed lower end is shown as being connected to the low point of the service pipe and extends downwardly into the heat exchanging chamber 17 to revaporize any condensed liquefied petroleum gas which collects in the service pipe and flows into the trap.

The standpipe 11, valved fitting 12 and both regulators 15 and 19 are shown as being housed within a metal protecting casing 25 secured to the top of the tank 10 and the cup-shaped heat exchanging chamber 17, being provided with a removable cover 26 to afford access to the filling and dispensing appurtenances, as explained in the aforesaid copending application.

In liquid eduction systems of the type thus far described, it has heretofore been customary to provide an atmospheric vent or breather tube for the first stage regulator. However, due to the rapid absorption of heat by the liquefied gas as some of it flashes into vapor when it passes through the first stage regulator, atmospheric moisture which collects in the vent or breather tube and even in the low pressure side of the diaphragm casing, will freeze and close them, thus preventing the diaphragm from functioning. To obviate this, the low pressure side of the diaphragm casing of the regulator 15 is here shown as being vented through a small tube 27 connected to the service pipe section 21 conveniently through a T fitting 28 so that the low pressure gas at, say, six ounces, acts on the low pressure side of the diaphragm. Since the gas contains no appreciable moisture, the tube can never become ice clogged and the regulator will function at all times. Even if the diaphragm of the first stage regulator should fail or rupture, the size of the gas vent tube 27 is so small that it will not permit a large quantity of liquefied gas to be by-passed into the service pipe. Moreover, the usual excess flow valve (not shown) in the fitting 12 will cut off the flow of liquefied gas to the regulator. Moreover, the pressure relief valve at 21 on the low pressure side of the second stage regulator will prevent any dangerous pressure from being built up in the service pipe.

From the foregoing description, it will be apparent that the improved system is absolutely dependable in operation because the supply of gas cannot be cut off due to ice clogging of the first stage regulator. Moreover, the first stage regulator is arranged near the heat exchanger where it can absorb some heat from it. Ice can accumulate on it without affecting its operation.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. In a liquefied gas storage and dispensing system of the class described, an underground pressure storage tank; a liquid eduction conduit communicating with the bottom portion of the tank; a first stage pressure reducing regulator of the diaphragm type in said conduit; a vaporizer connected to the conduit beyond the regulator; a vapor conduit connected to the vaporizer; a second stage pressure reducing regulator in said vapor conduit; a gas service pipe connected to said second stage regulator; and a breather tube for the first stage regulator communicating with the service pipe and using the low pressure gas therein to permit the diaphragm to function without being ice clogged or locked.

2. In a liquefied gas storage and dispensing system of the class described, an underground pressure storage tank; a liquid eduction conduit communicating with the bottom portion of the tank; a first stage pressure reducing regulator of the diaphragm type in said conduit; a vaporizer associated with the tank and connected to said regulator; a vapor conduit connected to the vaporizer; a second stage pressure reducing regulator in said vapor conduit having a pressure relief valve on the low pressure side; a gas service pipe connected to the low pressure side of said second stage regulator having a section adjacent to the first stage regulator; and a small breather tube connecting the low pressure side of the diaphragm chamber of the first stage regulator to the adjacent section of the service pipe, using the low pressure gas to permit the diaphragm to function.

3. In a liquefied gas storage and dispensing system of the class described, an underground pressure storage tank having a standpipe and a valved fitting thereon housed within a protecting casing; a liquid eduction pipe communicating with the bottom portion of the tank and connected to said fitting; a liquid delivery conduit connected to the fitting; a first stage diaphragm operated regulator in said liquid delivery conduit adjacent to the tank; a vaporizer associated with the tank and connected to said regulator; a vapor conduit connected to the vaporizer; a second stage pressure reducing regulator connected to said vapor conduit and supported by said standpipe; a gas service pipe leading downwardly from said second stage regulator and outwardly from the casing adjacent to the first stage regulator; and a breather tube for the diaphragm of said first stage regulator connected to the service pipe.

4. In a liquefied gas storage and dispensing system of the class described, a pressure storage tank; a liquid eduction conduit communicating with the bottom portion of the tank; a vaporizer connected to said conduit; a first stage pressure reducing regulator also connected to the conduit between the vaporizer and the tank and having a vent; a vapor conduit connected to the vaporizer; a second stage pressure reducing regulator in said vapor conduit; and a breather tube connecting said vent to communicate with the low pressure side of said second stage regulator for preventing ice from accumulating in said breather tube and said first stage regulator.

5. In a liquefied gas storage and dispensing system of the class described, a pressure storage tank; a gas discharge conduit connected to the tank; a pressure reducing regulator connected to said conduit having a vent; and means connecting said vent to a source of the same gas at a pressure less than that existing on the low pressure side of the regulator.

LOYD J. WHITE.